US010111271B2

(12) United States Patent
Lim et al.

(10) Patent No.: US 10,111,271 B2
(45) Date of Patent: Oct. 23, 2018

(54) DEVICE-TO-DEVICE COMMUNICATION

(71) Applicant: Alcatel Lucent, Boulogne Billancourt (FR)

(72) Inventors: Seau Sian Lim, Swindon (GB); Chandrika Worrall, Swindon (GB)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/513,190

(22) PCT Filed: Sep. 11, 2015

(86) PCT No.: PCT/EP2015/070865
§ 371 (c)(1),
(2) Date: Mar. 22, 2017

(87) PCT Pub. No.: WO2016/045995
PCT Pub. Date: Mar. 31, 2016

(65) Prior Publication Data
US 2017/0238355 A1    Aug. 17, 2017

(30) Foreign Application Priority Data
Sep. 26, 2014    (EP) .................................... 14306494

(51) Int. Cl.
H04W 76/14        (2018.01)
H04W 72/02        (2009.01)
H04W 72/12        (2009.01)

(52) U.S. Cl.
CPC ........... *H04W 76/14* (2018.02); *H04W 72/02* (2013.01); *H04W 72/121* (2013.01); *H04W 72/1284* (2013.01); *H04W 72/1289* (2013.01)

(58) Field of Classification Search
CPC ............. H04W 76/023; H04W 72/121; H04W 72/1284; H04W 72/1289
See application file for complete search history.

(56) References Cited

U.S. PATENT DOCUMENTS

| 2012/0083283 A1 | 4/2012 | Phan et al. | |
| 2015/0289253 A1* | 10/2015 | Pan | H04W 72/0406 370/329 |
| 2016/0183276 A1* | 6/2016 | Marinier | H04W 72/02 370/329 |

FOREIGN PATENT DOCUMENTS

WO    WO 2010/082084 A1    7/2010

OTHER PUBLICATIONS

International Search Report for PCT/EP2015/070865 dated Nov. 12, 2015.

* cited by examiner

*Primary Examiner* — Duc C Ho
(74) *Attorney, Agent, or Firm* — Fay Sharpe LLP

(57) ABSTRACT

A user equipment method, user equipment, a network node method, a network node and computer program products are disclosed. The user equipment method for device-to-device communication comprises: upon requiring to perform device-to-device communication with user equipment from a plurality of groups, transmitting a scheduling announcement for each of the plurality of groups, each scheduling announcement identifying resources within which data intended for user equipment belonging to each group is to be transmitted. In this way, the user equipment can be perform device-to-device communications with different groups at the same time. In particular, the user equipment can choose the target groups that it wants to provide the device-to-device data to and is able to perform simultaneous transmissions of that data to those multiple groups.

9 Claims, 1 Drawing Sheet

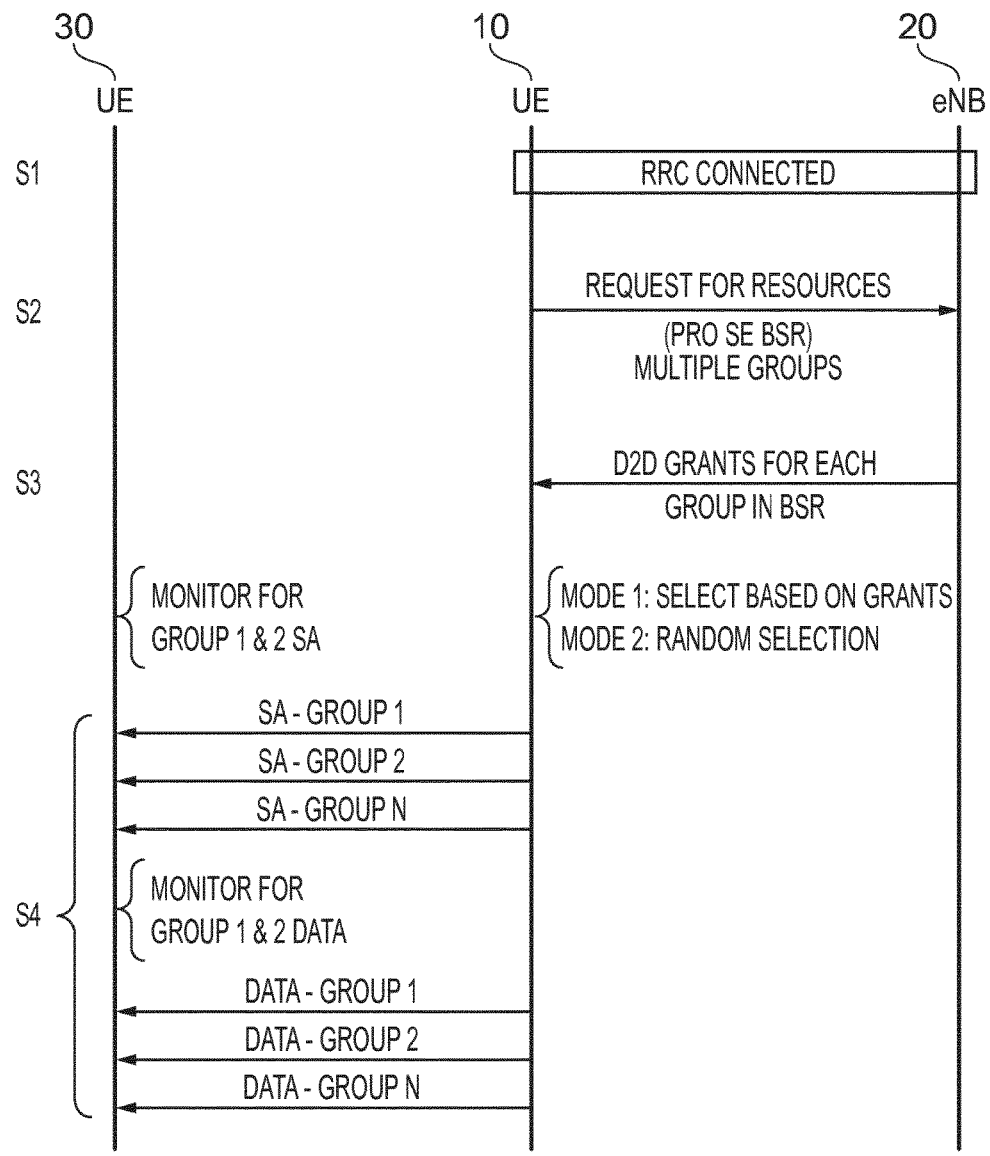

DEVICE-TO-DEVICE COMMUNICATION

FIELD OF THE INVENTION

The present invention relates to a user equipment method, user equipment, a network node method, a network node and computer program products.

BACKGROUND

Wireless telecommunications networks are known. In a cellular system, radio coverage is provided to user equipment, for example, mobile telephones, by geographical area. Those geographical areas of radio coverage are known as cells. A base station is located in each geographical area to provide the required radio coverage and support communication with the user equipment. A base station may support more than one cell providing coverage in the same geographical area. User equipment in the area served by a base station receives information and data from that base station and transmits information and data to that base station. Information and data transmitted by a base station to user equipment occurs on frequency channels of radio carriers known as downlink carriers. Information and data transmitted by user equipment to a base station occurs on frequency channels of radio carriers known as uplink carriers.

An emerging function for user equipment is that of device-to-device proximity services, where user equipment can communicate directly between them with no or little network involvement. In particular, it is desired to provide techniques for device-to-device discovery and device-to-device communications for both public safety and non-public safety scenarios. To support this, two types of resource allocation schemes have been introduced namely mode 1 and mode 2 resource allocation schemes for device-to-device communication transmission. Mode 1 can only be used when a transmitting user equipment is in coverage and requires the transmitting user equipment to request radio resources from the network for every transmission or for series of transmissions. Mode 2 can be used when a transmitting user equipment is in coverage or out of coverage and the transmitting user equipment autonomously selects from a pool of radio resources (preconfigured or provided by the network) for every transmission. However, the provision of device-to-device proximity services can lead to unexpected consequences. Accordingly, it is desired to provide an improved technique for controlling devices within wireless telecommunications networks.

SUMMARY

According to a first aspect, there is provided a user equipment method for device-to-device communication, comprising: upon requiring to perform device-to-device communication with user equipment from a plurality of groups, transmitting a scheduling announcement for each of the plurality of groups, each scheduling announcement identifying resources within which data intended for user equipment belonging to each group is to be transmitted.

The first aspect recognizes that it is possible for user equipment to belong to multiple device-to-device communication groups or sub-groups and that it may be necessary for the user equipment to communicate with the multiple groups or sub-groups at the same time. For example, a commander-in-chief may want to communicate with different subsets of public safety groups (for example, the fire brigade, ambulance, law enforcers) at the same time. Although it may be possible to do this by communicating in a device-to-device broadcast mode, where the target destination addresses all public safety user equipment, this would mean that different public safety groups will hear the information and may use that information erroneously. Also, whilst it is possible that different groups always cross-listen to each other, this requires every user equipment to be provisioned to listen to multiple groups. Although a super-group may be formed which comprises multiple groups, this is not very flexible since such group formations need to be pre-provisioned. In addition, only the medium access control service data unit (MAC SDU) targeted for the same group or sub-group can be multiplexed into a medium access control protocol data unit (MAC PDU) which means that a device-to-device grant can only be for a target group. Furthermore, in existing cellular networks, there is no requirement to send multiple different transmissions simultaneously since there is only ever one receiving node (the base station).

Accordingly, a method for a user equipment to support device-to-device communications may be provided. The method may comprise, when device-to-device communication is to be performed with user equipment from a plurality or more than one device-to-device communication group or sub-group, a scheduling announcement may be transmitted for each of the groups or sub-groups. Each scheduling announcement may identify or indicate resources which encode the data for each group or sub-group. In this way, the user equipment can be perform device-to-device communications with different groups at the same time. In particular, the user equipment can choose the target groups that it wants to provide the device-to-device data to and is able to perform simultaneous transmissions of that data to those multiple groups.

In one embodiment, the transmitting comprises transmitting a corresponding plurality of scheduling announcements, one for each of the plurality of groups. Accordingly, where there is more than one group or sub-group, a corresponding more than one scheduling announcement may be transmitted, each one of which corresponds to one of the groups or sub-groups.

In one embodiment, the plurality of groups comprises N groups and the transmitting comprises transmitting N scheduling announcements. Accordingly, when data is to be transmitted to a number of groups or sub-groups, that number of scheduling announcements may be transmitted.

In one embodiment, the transmitting comprises transmitting each scheduling announcement with a single sub-frame. Accordingly, the user equipment may transmit the scheduling announcements within a single sub-frame or time interval.

In one embodiment, the method comprises transmitting data for device-to-device communication with user equipment belonging to each group using the resources identified by each scheduling announcement for that group. Accordingly, the data for each group or sub-group may be transmitted within the data resources identified by the scheduling announcement for that group or sub-group.

In one embodiment, each group is identified by a unique group identifier, a portion of the group identifier being encoded within the corresponding scheduling announcement and another portion of the group identifier being encoded within the data. Hence, the group or sub-group identifier is split between the scheduling announcement and the data. A portion of the identifier may be first encoded within the scheduling announcement and another portion of the identifier may then be encoded within the data.

In one embodiment, the another portion of the group identifier is encoded within a MAC PDU transmitted using resources identified by the scheduling announcement.

In one embodiment, the method comprises requesting resources from the network to be allocated to support device-to-device communications with each group.

Accordingly, the user equipment may determine how many groups or sub-groups it wishes to perform device-to-device communication with and request resources from the network for such communication.

In one embodiment, the method comprises receiving an indication of resources to be allocated to support device-to-device communications with each group. Accordingly, the network may allocate the resources requested by the user equipment to support device-to-device communications with the appropriate groups or sub-groups. In other words, the network may provide multiple device-to-device grants to the same user equipment for the same subframe.

In one embodiment, the indication of resources to be allocated to support device-to-device communications with each group comprises resources to be allocated for transmission of each scheduling announcement for that group and resources to be allocated for transmission of data for that group. Hence, the resources may indicate both the resources used for each scheduling announcement, together with the resources for the transmission of data.

According to a second aspect, there is provided user equipment for device-to-device communication, comprising: transmission logic operable, upon requiring to perform device-to-device communication with user equipment from a plurality of groups, to transmit a scheduling announcement for each of the plurality of groups, each scheduling announcement identifying resources within which data intended for user equipment belonging to each group is to be transmitted.

In one embodiment, the transmission logic is operable to transmit a corresponding plurality of scheduling announcements, one for each of the plurality of groups.

In one embodiment, the plurality of groups comprises N groups and the transmission logic is operable to transmit N scheduling announcements.

In one embodiment, the transmission logic is operable to transmit each scheduling announcement with a single sub-frame.

In one embodiment, the transmission logic is operable to transmit data for device-to-device communication with user equipment belonging to each group using the resources identified by each scheduling announcement for that group.

In one embodiment, each group is identified by a unique group identifier and the transmission logic is operable to encode a portion of the group identifier within the corresponding scheduling announcement and to encode another portion of the group identifier within the data.

In one embodiment, the transmission logic is operable to encode the another portion of the group identifier within a MAC PDU transmitted using resources identified by the scheduling announcement.

In one embodiment, the transmission logic is operable to request resources from the network be allocated to support device-to-device communications with each group.

In one embodiment, the user equipment comprises reception logic operable to receive an indication of resources to be allocated to support device-to-device communications with each group.

In one embodiment, the indication of resources to be allocated to support device-to-device communications with each group comprises resources to be allocated for transmission of each scheduling announcement for that group and resources to be allocated for transmission of data for that group.

According to a third aspect, there is provided a network node method of supporting device-to-device communication, comprising: in response to a request for resources from user equipment requiring to perform device-to-device communication with user equipment from a plurality of groups, transmitting to the user equipment an indication of resources to be allocated to support device-to-device communications with each group.

In one embodiment, the indication of resources to be allocated to support device-to-device communications with each group comprises resources to be allocated for transmission of each scheduling announcement for that group and resources to be allocated for transmission of data for that group.

In one embodiment, the resources to be allocated for transmission of each scheduling announcement are provided within a single sub-frame.

According to a fourth aspect, there is provided a network node for supporting device-to-device communication, comprising: transmission logic operable, in response to a request for resources from user equipment requiring to perform device-to-device communication with user equipment from a plurality of groups, to transmit to the user equipment an indication of resources to be allocated to support device-to-device communications with each group.

In one embodiment, the indication of resources to be allocated to support device-to-device communications with each group comprises resources to be allocated for transmission of each scheduling announcement for that group and resources to be allocated for transmission of data for that group.

In one embodiment, the resources to be allocated for transmission of each scheduling announcement are provided within a single sub-frame.

According to a fifth aspect, there is provided a computer program product operable, when executed on a computer, to perform the method steps of the first or third aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 1 illustrates schematically the messaging between user equipment and the base station according to embodiments.

DESCRIPTION OF THE EMBODIMENTS

Before discussing the embodiments in any more detail, first an overview will be provided. Embodiments provide an arrangement whereby user equipment is operable to perform device-to-device communication with different groups or sub-groups of user equipment. This is achieved by the user equipment wishing to perform such communication with different groups or sub-groups transmitting multiple scheduling announcement messages within the same sub-frame, each scheduling announcement message being associated with a different group or sub-group with which the user equipment wishes to perform device-to-device communication. The data to be transmitted to each group or sub-group is then transmitted using resources identified by the scheduling announce message. In this way, a single user equipment can send multiple transmission in the same sub-frame to different groups or sub-groups of user equipment.

Accordingly, in embodiments, the transmitting device-to-device user equipment can transmit different device-to-device data information for multiple groups or sub-groups in the same sub-frame using different device-to-device grants (for mode 1) or by selecting multiple sets of resources from the resource pool (for mode 2) while the receiving device-to-device user equipment decodes only the device-to-device data information for the groups that it is provisioned with.

In a mode 1 transmission scheme, the transmitting user equipment has to request resources from the base station and the base station provides the resource in the form of device-to-device grants to the user equipment. Each device-to-device grant consists of the scheduling announce resource, as well as the data resource.

In a mode 2 transmission scheme, the transmitting user equipment randomly selects the scheduling announce resource from the scheduling announce resource pool and the data resource from the data resource pool.

Example Operation

FIG. 1 illustrates schematically the messaging between user equipment and the base station according to embodiments. FIG. 1 illustrates the operation in both mode 1 and mode 2, although it will be appreciated that only one mode will be utilized at any one time.

Mode 1

At step S1, user equipment 10 is radio resource control (RRC) connected to the base station 20.

At step S2, the user equipment 10 which wishes to initiate device-to-device communications with other user equipment 30 belonging to multiple groups or sub-groups indicates to the base station 20 the buffer occupancy of the buffers containing the data required to be transmitted to the different target groups. Each of these different buffer occupancies are transmitted simultaneously via a proximity service (ProSE)/device-to-device buffer status report (BSR). For example, the user equipment 10 may wish to transmit data to groups 1, 2 and 8 and/or to sub-groups 1A, 2F and 8Y. Accordingly, the request for resources at step S2 indicates the buffer occupancy for each of these groups or sub-groups.

At step S3, the base station 20 provides the user equipment 10 with multiple device-to-device grants, one for each of the different target groups or sub-groups in the same sub-frame. That is to say, resources within a single sub-frame are allocated by the multiple grants, these resources being allocated for device-to-device transmissions for the different groups or sub-groups.

Mode 2

For mode 2, step S1 may or may not be omitted as the scheduling announcement resource pool may be provided in broadcast signalling from the base station 20 and so can be received by the user equipment when in idle mode without having to enter the RRC connected mode. Also, steps S2 and S3 are omitted and instead the user equipment 10 randomly selects multiple scheduling announcement resources from a scheduling announcement resource pool, as well as data resources from the data resource pool within the same sub-frame.

Thereafter, for both mode 1 and mode 2 operation, the user equipment 10, at step S4, sends multiple scheduling announcements, each belonging to a target group or sub-group in the same sub-frame and sends data to multiple groups or sub-groups using the resources indicated in the respective scheduling announcement in the same sub-frame.

Group Identifiers

Typically, each group or sub-group is identified by a 32 bit identifier. The first 8 bits of that identifier may be encoded within the scheduling announcements, while the remaining 24 bits may be encoded within the header of a MAC PDU carrying the data within the data resources indicated by the scheduling announce message. The receiving user equipment are provisioned with the group or sub-group identifiers which identify the groups or sub-groups to which they belong.

The user equipment 30 is a member of groups 1 and 2 and monitors the content of the scheduling announcement messages to see whether the 8 most significant bits of those groups or sub-groups identifiers match any of those within the scheduling announcement messages. If there is a match, then the user equipment listens to the resources identified by those scheduling announcement messages and determines whether there is a match for the remaining 24 bits within the header of the MAC PDU. If there is a match, then the user equipment attempts to decode the data within the MAC PDU.

For the same information to be sent to multiple groups, the user selects the groups that it would like this information to be sent and the user equipment upper layer will send the same information to the access stratum on one of the logical channels of each group.

Accordingly it can be seen that embodiments allows for user equipment to receive multiple grants from the network and send multiple service announcements for multiple groups or sub-groups in the same subframe. This provides the flexibility to send information to specific groups or sub-groups by the transmitting user equipment on the fly and allows the transmitting user equipment to send multiple service announcements and multiple device-to-device data in the same subframe.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The program storage devices may be, e.g., digital memories, magnetic storage media such as a magnetic disks and magnetic tapes, hard drives, or optically readable digital data storage media. The embodiments are also intended to cover computers programmed to perform the steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A user equipment method for device-to-device communication, comprising:
    upon requiring to perform device-to-device communication with user equipment from a plurality of device-to-device communication groups, transmitting a scheduling announcement for each of said plurality of groups within a single sub-frame, each scheduling announcement identifying resources within which data intended for user equipment belonging to each group is to be transmitted; and
    transmitting data for device-to-device communication with user equipment belonging to each group using said resources identified by each scheduling announcement for that group.

2. The method of claim 1, wherein said transmitting comprises transmitting a corresponding plurality of scheduling announcements, one for each of said plurality of groups.

3. The method of claim 1, wherein each group is identified by a unique group identifier, a portion of said group identifier being encoded within said corresponding scheduling announcement and another portion of said group identifier being encoded within said data.

4. The method of claim 3, wherein said another portion of said group identifier is encoded within a MAC PDU transmitted using resources identified by said scheduling announcement.

5. The method of claim 1, comprising requesting resources from the network to be allocated to support device-to-device communications with each group.

6. The method of claim 1, comprising receiving an indication of resources to be allocated to support device-to-device communications with each group.

7. The method of claim 6, wherein said indication of resources to be allocated to support device-to-device communications with each group comprises resources to be allocated for transmission of each scheduling announcement for that group and resources to be allocated for transmission of data for that group.

8. A user equipment for device-to-device communication, comprising:
    at least one processor; and
    at least one memory including computer program code;
    the at least one memory and the computer program code configured to, with the at least one processor, cause the user equipment at least to:
    upon requiring to perform device-to-device communication with user equipment from a plurality of device-to-device communication groups, transmit a scheduling announcement for each of said plurality of groups within a single sub-frame, each scheduling announcement identifying resources within which data intended for user equipment belonging to each group is to be transmitted; and
    transmit data for device-to-device communication with user equipment belonging to each group using said resources identified by each scheduling announcement for that group.

9. A user equipment comprising:
    at least one processor; and
    at least one memory including computer program code;
    the at least one memory and the computer program code configured to, with the at least one processor, cause the user equipment to perform the method of claim 1.

* * * * *